United States Patent
Kwiat et al.

(10) Patent No.: US 9,832,220 B2
(45) Date of Patent: Nov. 28, 2017

(54) SECURITY METHOD FOR ALLOCATION OF VIRTUAL MACHINES IN A CLOUD COMPUTING NETWORK

(71) Applicant: THE UNITED STATES OF AMERICA AS REPRESENTED BY THE SECRETARY OF THE AIR FORCE, Washington, DC (US)

(72) Inventors: Luke Kwiat, Whitesboro, NY (US); Charles Kamhoua, Liverpool, NY (US); Kevin Kwiat, Whitesboro, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 171 days.

(21) Appl. No.: 14/861,227

(22) Filed: Sep. 22, 2015

(65) Prior Publication Data
US 2017/0085582 A1 Mar. 23, 2017

(51) Int. Cl.
*H04L 29/06* (2006.01)
*G06F 9/455* (2006.01)

(52) U.S. Cl.
CPC ...... *H04L 63/1441* (2013.01); *G06F 9/45558* (2013.01); *H04L 63/1408* (2013.01); *H04L 63/20* (2013.01); *G06F 9/45533* (2013.01); *G06F 2009/4557* (2013.01); *G06F 2009/45587* (2013.01)

(58) Field of Classification Search
None
See application file for complete search history.

(56) References Cited

U.S. PATENT DOCUMENTS

| | | | |
|---|---|---|---|
| 9,471,777 B1* | 10/2016 | Juels | G06F 21/55 |
| 2014/0229621 A1* | 8/2014 | Song | H04L 47/822 709/226 |
| 2015/0249685 A1* | 9/2015 | Crane | H04L 63/20 726/1 |
| 2016/0072770 A1* | 3/2016 | Crane | H04L 63/0281 726/22 |
| 2017/0048266 A1* | 2/2017 | Hovor | H04L 63/1433 |

OTHER PUBLICATIONS

Kamhoua et al., Game Theoretic Modeling of Security and Interdependency in a Public Cloud, 2014, 2014 IEEE International Conference on Cloud Computing, 514-521.*

(Continued)

*Primary Examiner* — Saleh Najjar
*Assistant Examiner* — Louis Teng
(74) *Attorney, Agent, or Firm* — Joseph A. Mancini

(57) ABSTRACT

A method for enhancing security in a cloud computing system by allocating virtual machines over hypervisors, in a cloud computing environment, in a security-aware fashion. The invention solves the cloud user risk problem by inducing a state such that, unless there is a change in the conditions under which the present invention operates, the cloud users do not gain by deviating from the allocation induced by the present invention. The invention's methods include grouping virtual machines of similar loss potential on the same hypervisor, creating hypervisor environments of similar total loss, and implementing a risk tiered system of hypervisors based on expense factors.

16 Claims, 9 Drawing Sheets

| | $(U_1,N), (U_2,N), (U_3,I)$ 216 | $(U_1,N), (U_2,I), (U_3,I)$ 218 |
|---|---|---|
| $A_1$ 206 | A: $q_N L_1 + q_N \pi L_2$ 228<br>U: $R - q_N \pi L_2$ 230 | A: $q_N L_1$<br>U: $R - e$ |
| $A_2$ 208 | A: $q_N L_2 + q_N \pi L_1$<br>U: $R - q_N L_2$ | A: $q_I L_2 + q_I \pi L_3$<br>U: $R - e - q_I L_2$ |
| $A_3$ 210 | A: $q_I L_3$<br>U: $R$ | A: $q_I L_3 + q_I \pi L_2$<br>U: $R - e - q_I \pi L_2$ |

| | Symbol | Notation |
|---|---|---|
| 202 | $L_i$ | User $i$'s expected loss from a VM compromise, where $L_1 < L_2 < L_3$ |
| 204 | $A_i$ | Attacker's strategy "launch an attack on User $i$" |
| 212 | $I$ | User's strategy "Invest" |
| 214 | $N$ | User's strategy "Not invest" |
| 220 | $e$ | Total expense required to invest in security. |
| 222 | $q_N$ | Probability of a successful attack on a user given that he has not invested in security |
| 224 | $q_I$ | Probability of a successful attack on a user given that he has invested in security. $q_I < q_N$ |
| 232 | $\pi$ | Probability that the hypervisor is compromised given a successful attack on a user. $0 < \pi < 1$ |

(56) References Cited

OTHER PUBLICATIONS

Wei et al., A game-theoretic method of fair resource allocation for cloud computing services, 2009, Springer Science+Business Media.*

Bedi et al., Securing Cloud Infrastructure Against Co-Resident DoS Attacks Using Game Theoretic Defense Mechanisms, 2012, ACM.*

Han et al., Security Games for Virtual Machine Allocation in Cloud Computing, 2013, Springer International Publishing Switzerland.*

* cited by examiner

| | $(U_1,N), (U_2,N), (U_3,N), \ldots,$ $(U_{n-2},N), (U_{n-1},N), (U_n,I)$ | $(U_1,N), (U_2,N), (U_3,N), \ldots,$ $(U_{n-2},N), (U_{n-1},I), (U_n,I)$ | ... | $(U_1,N), (U_2,N), (U_3,I), \ldots,$ $(U_{n-2},I), (U_{n-1},I), (U_n,I)$ | $(U_1,N), (U_2,I), (U_3,I), \ldots,$ $(U_{n-2},I), (U_{n-1},I), (U_n,I)$ |
|---|---|---|---|---|---|
| $A_1$ | $A_1: q_N L_1 + q_N \pi(L_2 + \cdots + L_{n-1})$<br>$U_1: R - q_N L_1$<br>$U_2: R - q_N \pi L_2$<br>$U_3: R - q_N \pi L_3$<br>...<br>$U_{n-2}: R - q_N \pi L_{n-2}$<br>$U_{n-1}: R - q_N \pi L_{n-1}$<br>$U_n: R - e$ | $A_1: q_N L_1 + q_N \pi(L_2 + \cdots + L_{n-2})$<br>$U_1: R - q_N L_1$<br>$U_2: R - q_N \pi L_2$<br>$U_3: R - q_N \pi L_3$<br>...<br>$U_{n-2}: R - q_N \pi L_{n-2}$<br>$U_{n-1}: R$<br>$U_n: R - e$ | ... | $A_1: q_N L_1 + q_N \pi L_2$<br>$U_1: R - q_N L_1$<br>$U_2: R - q_N \pi L_2$<br>$U_3: R - e$<br>...<br>$U_{n-2}: R - e$<br>$U_{n-1}: R - e$<br>$U_n: R - e$ | $A_1: q_N L_1$<br>$U_1: R - q_N L_1$<br>$U_2: R - e$<br>$U_3: R - e$<br>...<br>$U_{n-2}: R - e$<br>$U_{n-1}: R - e$<br>$U_n: R - e$ |
| $A_2$ | $A_2: q_N L_2 + q_N \pi(L_1 + L_3 + \cdots + L_n)$<br>$U_1: R - q_N \pi L_1$<br>$U_2: R - q_N L_2$<br>$U_3: R - q_N \pi L_3$<br>...<br>$U_{n-2}: R - q_N \pi L_{n-2}$<br>$U_{n-1}: R - q_N \pi L_{n-1}$<br>$U_n: R - e$ | $A_2: q_N L_2 + q_N \pi(L_1 + L_3 + \cdots + L_{n-2})$<br>$U_1: R - q_N \pi L_1$<br>$U_2: R - q_N L_2$<br>$U_3: R - q_N \pi L_3$<br>...<br>$U_{n-2}: R - q_N \pi L_{n-2}$<br>$U_{n-1}: R - q_N \pi L_{n-1}$<br>$U_n: R - e$ | ... | $A_2: q_N L_2 + q_N \pi L_1$<br>$U_1: R - q_N \pi L_1$<br>$U_2: R - q_N L_2$<br>$U_3: R - e$<br>...<br>$U_{n-2}: R - e$<br>$U_{n-1}: R - e$<br>$U_n: R - e$ | $A_{n-2}: q_I L_2 + q_I \pi(L_3 + L_4 + \cdots + L_{n-1} + L_n)$<br>$U_1: R$<br>$U_2: R - e - q_I L_2$<br>$U_3: R - e - q_I \pi L_3$<br>...<br>$U_{n-2}: R - e - q_I \pi L_{n-2}$<br>$U_{n-1}: R - e - q_I \pi L_{n-1}$<br>$U_n: R - e - q_I \pi L_n$ |
| ... | ... | ... | ... | ... | ... |
| $A_{n-2}$ | $A_{n-2}: q_N L_{n-2} + q_N \pi(L_1 + L_2 + \cdots + L_{n-3} + L_{n-1} + L_n)$<br>$U_1: R - q_N \pi L_1$<br>$U_2: R - q_N \pi L_2$<br>$U_3: R - q_N \pi L_3$<br>...<br>$U_{n-2}: R - q_N L_{n-2}$<br>$U_{n-1}: R - q_N \pi L_{n-1}$<br>$U_n: R - e$ | $A_{n-2}: q_N L_{n-2} + q_N \pi(L_1 + L_2 + \cdots + L_{n-3})$<br>$U_1: R - q_N \pi L_1$<br>$U_2: R - q_N \pi L_2$<br>$U_3: R - q_N \pi L_3$<br>...<br>$U_{n-2}: R - q_N L_{n-2}$<br>$U_{n-1}: R$<br>$U_n: R - e$ | ... | $A_{n-2}: q_I L_{n-2} + q_I \pi(L_3 + L_4 + \cdots + L_{n-3} + L_{n-1} + L_n)$<br>$U_1: R$<br>$U_2: R$<br>$U_3: R - e - q_I \pi L_3$<br>...<br>$U_{n-2}: R - e - q_I L_{n-2}$<br>$U_{n-1}: R - e - q_I \pi L_{n-1}$<br>$U_n: R - e - q_I \pi L_n$ | $A_{n-2}: q_I L_{n-2} + q_I \pi(L_2 + L_3 + \cdots + L_{n-3} + L_{n-1} + L_n)$<br>$U_1: R$<br>$U_2: R - e - q_I \pi L_2$<br>$U_3: R - e - q_I \pi L_3$<br>...<br>$U_{n-2}: R - e - q_I L_{n-2}$<br>$U_{n-1}: R - e - q_I \pi L_{n-1}$<br>$U_n: R - e - q_I \pi L_n$ |
| $A_{n-1}$ | $A_{n-1}: q_N L_{n-1} + q_N \pi(L_1 + L_2 + \cdots + L_{n-2} + L_n)$<br>$U_1: R - q_N \pi L_1$<br>$U_2: R - q_N \pi L_2$<br>$U_3: R - q_N \pi L_3$<br>...<br>$U_{n-2}: R - q_N \pi L_{n-2}$<br>$U_{n-1}: R - q_N L_{n-1}$<br>$U_n: R - e$ | $A_{n-1}: q_I L_{n-1} + q_I \pi L_n$<br>$U_1: R$<br>$U_2: R$<br>$U_3: R$<br>...<br>$U_{n-2}: R$<br>$U_{n-1}: R - e - q_I L_{n-1}$<br>$U_n: R - e - q_I L_n$ | ... | $A_{n-1}: q_I L_{n-1} + q_I \pi(L_3 + L_4 + \cdots + L_{n-2} + L_n)$<br>$U_1: R$<br>$U_2: R$<br>$U_3: R - e - q_I \pi L_3$<br>...<br>$U_{n-2}: R - e - q_I \pi L_{n-2}$<br>$U_{n-1}: R - e - q_I L_{n-1}$<br>$U_n: R - e - q_I \pi L_n$ | $A_{n-1}: q_I L_{n-1} + q_I \pi(L_2 + L_3 + \cdots + L_{n-2} + L_n)$<br>$U_1: R$<br>$U_2: R - e - q_I \pi L_2$<br>$U_3: R - e - q_I \pi L_3$<br>...<br>$U_{n-2}: R - e - q_I \pi L_{n-2}$<br>$U_{n-1}: R - e - q_I L_{n-1}$<br>$U_n: R - e - q_I \pi L_n$ |
| $A_n$ | $A_2: q_I L_n$<br>$U_1: R$<br>$U_2: R$<br>$U_3: R$<br>...<br>$U_{n-2}: R$<br>$U_{n-1}: R$<br>$U_n: R - e - q_I L_n$ | $A_n: q_I L_n + q_I \pi L_{n-1}$<br>$U_1: R$<br>$U_2: R$<br>$U_3: R$<br>...<br>$U_{n-2}: R$<br>$U_{n-1}: R - e - q_I \pi L_{n-1}$<br>$U_n: R - e - q_I L_n$ | ... | $A_{n-1}: q_I L_n + q_I \pi(L_3 + L_4 + \cdots + L_{n-2} + L_{n-1})$<br>$U_1: R$<br>$U_2: R$<br>$U_3: R - e - q_I \pi L_3$<br>...<br>$U_{n-2}: R - e - q_I \pi L_{n-2}$<br>$U_{n-1}: R - e - q_I \pi L_{n-1}$<br>$U_n: R - e - q_I L_n$ | $A_{n-1}: q_I L_n + q_I \pi(L_2 + L_3 + \cdots + L_{n-2} + L_{n-1})$<br>$U_1: R$<br>$U_2: R - e - q_I \pi L_2$<br>$U_3: R - e - q_I \pi L_3$<br>...<br>$U_{n-2}: R - e - q_I \pi L_{n-2}$<br>$U_{n-1}: R - e - q_I \pi L_{n-1}$<br>$U_n: R - e - q_I L_n$ |

402 Case 1: If $L_n > \frac{q_N}{q_I}(L_{n-1} + \pi L_{n-2} + \cdots + \pi L_2 + \pi L_1)$, then the strategy profile $(A_n, U_{n-1})$ is Nash equilibrium. 408

404 Case 2: If $L_n < \frac{q_N}{q_I}(L_{n-1} + \pi L_{n-2} + \cdots + \pi L_2 + \pi L_1)$ and $e > (q_N - q_I)L_{n-1}$, then the strategy profile $(A_{n-1}, U_{n-1})$ is a Nash equilibrium.

Sub-Case $2_1$: If $q_I L_n + q_I \pi L_{n-1} < q_N L_{n-2} + q_N \pi L_{n-3} + \cdots + q_N \pi L_1$, $e > (q_N - q_I)L_{n-1}$, and $e < q_N \pi L_{n-1}$, then the strategy profile $(A_{n-2}, U_{n-2})$ is a Nash equilibrium.

Sub-Case $2_2$: If $q_I L_n + q_I \pi L_{n-1} + q_I \pi L_{n-2} < q_N L_{n-3} + q_N \pi L_{n-4} + \cdots + q_N \pi L_1$, $e > (q_N - q_I)L_{n-2}$, and $e < q_N \pi L_{n-2}$, then the strategy profile $(A_{n-3}, U_{n-3})$ is a Nash equilibrium.

Sub-Case $2_3$: If $q_I L_n + q_I \pi L_{n-1} + q_I \pi L_{n-2} + q_I \pi L_{n-3} < q_N L_{n-4} + q_N \pi L_{n-5} + \cdots + q_N \pi L_1$, $e > (q_N - q_I)L_{n-2}$, and $e < q_N \pi L_{n-3}$, then the strategy profile $(A_{n-4}, U_{n-4})$ is a Nash equilibrium.

⋮

Sub-Case $2_{n-1}$: If $q_I L_n + q_I \pi L_{n-1} + q_I L_{n-2} + q_I \pi L_{n-3} + \cdots + q_I \pi L_3 < q_N L_2 + q_N \pi L_1$, $e > (q_N - q_I)L_2$, and $e < q_N \pi L_3$, then the strategy profile $(A_2, U_2)$ is a Nash equilibrium.

Sub-Case $2_n$: If $q_I L_n + q_I \pi L_{n-1} + q_I L_{n-2} + q_I \pi L_{n-3} + \cdots + q_I \pi L_2 < q_N L_1$, $e > (q_N - q_I)L_1$, and $e < q_N \pi L_2$, then the strategy profile $(A_1, U_1)$ is a Nash equilibrium.

406 Case 3: If none of the conditions in Case 1, Case 2 or its sub cases are met, then the game admits a mixed strategy Nash equilibrium. Find the user that balances out the total loss on each hypervisor such that the attacker is indifferent to targeting either hypervisor.

FIGURE 4

| CONDITION 1 | $L_1(q_N - q_I \pi) < e < L_n(q_N - q_I)$ |
|---|---|
| CONDITION 2 | $L_n > \frac{q_N}{q_I}(L_{n-1} + \pi L_{n-2} + \cdots + \pi L_2 + \pi L_1)$ |
| CONDITION 3 | $L_n < \frac{q_N}{q_I}(L_{n-1} + \pi L_{n-2} + \cdots + \pi L_2 + \pi L_1)$ AND $e > (q_N - q_I)L_{n-1}$ |

FIGURE 8

$$\alpha_1 = \frac{q_I(1-\pi)(L_n - L_i)}{q_N\pi(L_1 + L_2 + \cdots + L_{i-1}) - q_I\pi(L_{i+1} + L_{i+2} + \cdots + L_n) + [q_N - q_I(1-\pi)]L_i}$$

$$\alpha_2 = \frac{q_N\pi(L_1 + L_2 + \cdots + L_{i-2}) - q_I\pi(L_{i+1} + L_{i+2} + \cdots + L_n) + q_N L_{i-1} - q_I L_i}{q_N\pi(L_1 + L_2 + \cdots + L_{i-1}) - q_I\pi(L_{i+1} + L_{i+2} + \cdots + L_n) + [q_N(1-\pi) - q_I]L_i}$$

FIGURE 9

SECURITY METHOD FOR ALLOCATION OF VIRTUAL MACHINES IN A CLOUD COMPUTING NETWORK

STATEMENT OF GOVERNMENT INTEREST

The invention described herein may be manufactured and used by or for the Government for governmental purposes.

BACKGROUND OF THE INVENTION

Cloud computing is the use of computing resources (hardware and software) delivered as a service over a network, such as the Internet. Cloud computing services can provide computational capacity, data storage, networking/routing via a large pool of shared resources operated by an independent provider. Since the computing resources are delivered over a network, and control of the physical resources are separated from control of the computing resources, cloud computing is location-independent. This has allowed for end users of cloud resources to achieve quick, dynamic scalability without accruing much overhead costs or many long-term commitments to purchasing of computing resources. There are different approaches to the setup cloud computing systems, each structured to the needs of the end user. The different approaches are usually referred to as "public clouds," "private clouds." "hybrid clouds," and "multi-vendor clouds."

However, one of the largest discouragements from using cloud services, particularly public cloud services, comes from the inherent and unknown danger stemming from a shared platform—namely, the hypervisor. A hypervisor acts as the central manager of all end user's resources on a cloud network. These resources usually are embodied as virtual machines (VM), where VMs act as an implementation of a computer system and can run and execute programs as though they were running on a physical computer. A cloud computing facility can have hundreds of hypervisors that run thousands of virtual machines for many different end users.

Since many different users can run VMs on the same physical hardware, this can allow for possible exploitation from malicious entities. An attacker can launch an attack onto a VM and then compromise the underlying hypervisor and hardware. The attack can then be distributed throughout the hypervisor and onto all VMs running on that hypervisor. Under these conditions, one user's VM may be indirectly attacked when a direct attack is successfully launched on a different user's VM on the same hypervisor. This is possible based on unknown security vulnerabilities of the hypervisor, which, once compromised, can allow an attacker to permeate every VM on the targeted hypervisor [1]. This creates risk phenomena where a user must be aware not only of their own defenses against compromise, but also the defenses of another user. As a result, users with significant information assets could be discouraged from using the cloud since the potential loss associated with a successful attack is too large compared to the cost savings from switching to cloud resources. This phenomenon exhibits the game theoretic problem of negative externalities and interdependency, where the security of one player affects the security of another. As previously stated, a cloud provider can have hundreds of hypervisors and thousands of VMs at any given time to manage. One of the largest tasks a cloud provider must undertake on a constant basis is the proper assignment of newly created instances of VMs to hypervisors. This process is referred to as allocation. The allocation process and the determination of what hypervisor a VM is assigned to usually includes several variables that are tailored to the individual cloud provider's preferences. Most methods for VM allocation consist of several quantifiable metrics such as load balancing and energy consumption. There have also been several patented methods for VMs based on market demand [U.S. Pat. No. 9,027,024] or scarcity of resources [U.S. Pat. No. 8,464,267]. However, there exists no current allocation process that considers cloud security in an efficient or systematic manner. With security becoming an increasingly more important concern among both public and private interests, cloud providers must begin to consider security allocation mechanisms. The invention serves to provide a VM allocation process based on security needs in order for cloud providers to further improve the utility that cloud resources have to offer end users.

Due to the interacting and interdependent nature between the cloud users and infiltrators, the present invention is based on the mathematical discipline of game theory. Game theory has been used in economics and business. In the present invention, a method has been devised for allocating VMs over hypervisors in a security-aware fashion. The result is equilibrium among users of VMs in a cloud computing environment. The equilibrium is stable because, unless there is a change in the conditions under which the present invention operates, the cloud users do not gain by deviating from the allocation induced by the present invention.

OBJECTS AND SUMMARY OF THE INVENTION

The features and advantages described in this summary and the following detailed description are not all-inclusive. Many additional features and advantages will be apparent to one of ordinary skill in the art in view of the drawings, specification, and claims hereof.

In the present invention, a method has been devised for allocating virtual machines over hypervisors, in a cloud computing environment, in a security-aware fashion. The invention solves the cloud user risk problem by inducing a state such that, unless there is a change in the conditions under which the present invention operates, the cloud users do not gain by deviating from the allocation induced by the present invention. Thus, the allocation method derived from the present invention is stable. This state is accomplished by several techniques. The techniques include grouping virtual machines of similar loss potential on the same hypervisor, creating hypervisor environments of similar total loss, and implementing a risk tiered system of hypervisors based on expense factors.

It is therefore an object of the present invention to model interaction between cloud computing users and potential attackers.

It is another object of the present invention to identify most likely targeted cloud computing users.

It is yet another object of the present invention to provide proactive responses to attacks on cloud computing users.

In an embodiment of the present invention, a method for enhancing security in a cloud computing system having a cloud computing provider, cloud computing users, and hypervisors, comprising a modeling of interactions between attackers and said cloud computing users, an identification of the most likely targeted users where the identification further comprises an observation of events and equilibrium states, and a reemployment of the model so as to minimize damage caused by an attacker and to provide a proactive response to subsequent attacks.

REFRENCES

[1] Vaughan-Nichols, Stephen. "Hypervisors: The Cloud's Potential Security Achilles Heel." www.zdnet.com. CBS Interactive, 29 Mar. 2014. Web. 14 Jul. 2014.

[2] Luke Kwiat, Charles Kamhoua Kevin Kwiat, Jian Tang, Andrew Martin, "Security-aware Virtual Machine Allocation in the Cloud: A Game Theoretic Approach" in the proceedings of IEEE International Conference on Cloud Computing, (IEEE CLOUD 2015) New York, N.Y., June-July 2015.

BRIEF DESCRIPTION OF THE DRAWINGS

FIG. 3 depicts an extension of FIG. 2.

FIG. 4 depicts the Nash Equilibrium that result from the game in FIG. 3, which is also useful for understanding various arrangements described herein.

FIG. 8 is a table of conditions at three different stages in the allocation process of FIG. 5.

FIG. 9 shows the arithmetic representation of probabilities $\alpha_1$ and $\alpha_2$.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENT

While the specification concludes with claims defining features of the embodiments described herein that are regarded as novel, it is believed that these embodiments will be better understood from a consideration of the description in conjunction with the drawings. As required, detailed arrangements of the present embodiments are disclosed herein; however, it is to be understood that the disclosed arrangements are merely exemplary of the embodiments, which can be embodied in various forms. Therefore, specific structural and functional details disclosed herein are not to be interpreted as limiting, but merely as a basis for the claims and as a representative basis for teaching one skilled in the art to variously employ the present embodiments in virtually any appropriately detailed structure. Further, the terms and phrases used herein are not intended to be limiting but rather to provide an understandable description of the present arrangements.

A system for addressing the security and interdependency issues of the cloud and providing various advantages is discussed below. First, an embodiment will be shown describing appropriate environments for the application of a security-based allocation system. Second, several embodiments will be presented that model the interactions between an attacker and cloud users as well as the conditions which drive their choices. Third, a procedure will be shown for implementing and using a security-based allocation system in the context of the models discussed in the second part.

Figure 1:
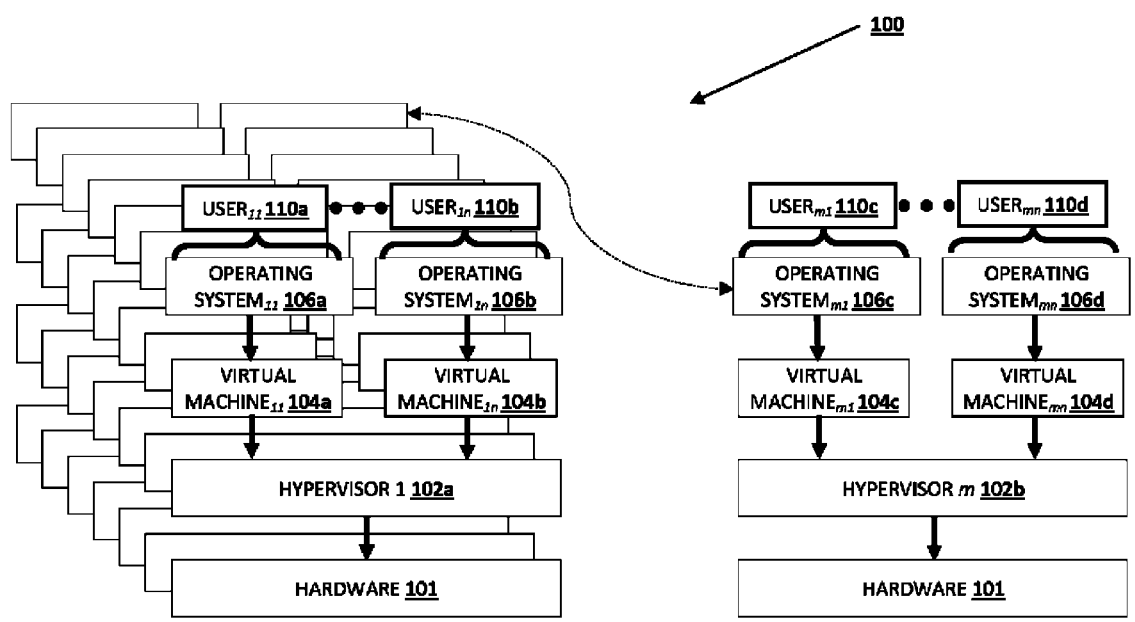
FIG. 1 depicts a cloud computing environment according to an embodiment of the present invention

Referring to FIG. 1, one type of embodiment for a cloud system 100 is shown. A public cloud infrastructure is built on hardware 101 that is running Hypervisor $H_1$ 102a. Virtual machines instances $VM_{11} \ldots VM_{1n}$ (104a, 104b). Note that the first subscript states which hypervisor each user is located on and the second subscript denotes the user's number. Operating systems which manage the VM's on the cloud are designated (on the first hypervisor) as operating system $OS_{11} \ldots OS_{1n}$. (106a. 106b). Operating systems in turn has n users that are denoted as User $U_{11} \ldots U_{1n}$ (108a, 108b) whom each run VMs $VM_{11}, \ldots VM_{1n}$ (104a, 104b), respectively. Each user may run multiple VM instances (and multiple operating systems) but multiple VMs run by one user may be mathematically combined into one VM for the purpose of this embodiment This setup holds true for all hypervisors, and thus the mth hypervisor 102b will execute virtual machines $VM_{m1} \ldots VM_{mn}$ (104c, 104d), managed by $OS_{m1} \ldots OS_{mn}$ (106c, 106d), and run by users $U_{m1} \ldots U_{mn}$ (108c, 108d. Although the physical infrastructure a cloud may use will vary (such as different hypervisors like Xen, VMware, KVM), the underlying principle of a shared platform in which users are exposed to collateral damage holds true.

Several issues arise within the cloud infrastructure once this model is examined. Users that run on the same hypervisor 102a are susceptible to a 'bad neighbor' effect in which an attacker, who has compromised one user's (106a) VMs may transverse across the hypervisor to launch an attack on another user (such as 106b) on the same hypervisor. This is the problem of interdependency, where a user who instantiates an unsecure VM will cause an entire system to be at risk. Our method aims to reduce this externality, and may be shown by several different embodiments. However, there are four critical criteria the allocation method uses that hold for all embodiments and the embodiments described hereon:

First, VMs are allocated in such a way that users do not experience any gain in utility by unilaterally deviating from the allocation induced by the present invention. The three criterions that follow are a direct result of satisfying this one.

Second, VMs of similar loss potential are grouped together to reduce interdependency between users. The loss potential of a particular VM of any given user is calculated as the monetary loss of the user given that their virtual machine is compromised. Monetary loss can include events such as lost information, stolen trade secrets or server downtime. When VMs of similar loss potential are grouped onto the same hypervisor, the effect of interdependency wherein the security of one user affects the security of another is greatly reduced. When users of similar loss potential are allocated together, they will not have any increase in utility from changing their placement of VMs.

Third, VMs are allocated in such a way that the total expected loss from a successful compromise on a hypervisor is approximately equal on all hypervisors. The total expected loss from a hypervisor is calculated as the sum of each compromised VM on that hypervisor. The distribution of VMs across hypervisors such that the total expected loss of each hypervisor is approximately equal to one another is herein referred to as "risk balanced." When the hypervisors of a cloud system are risk balanced, the individual users will not have any increase in utility from changing their placement of VMs.

Fourth, there is a non-zero cost associated with upgrading a VM to decrease a chance of a successful attack, and the users that pay this expense will experience some greater level of protection as compared to other users. The differing level of protection of VMs causes a differing level of security in each of the hypervisor, and the differing levels of security in each hypervisor creates (and is herein referred to as) a "risk tiered" system of hypervisors. The more the expense paid by the VM user, the more secure the VM and hypervisor. Depending on the various embodiments of which this expense may be structured, the cloud provider may use this expense as a tool to induce a state in which users will not have any increase in utility from changing their placement of VMs.

The placement of similar potential loss virtual machines together (second criterion), combined with risk balancing (third criterion) and a risk tiered profiling of hypervisors (fourth criterion) form the three main parts in the allocation method, as will be embodied. There can be other various constraints and variables that can be added to modify the method, of which some will appear in the proceeding embodiment. One skilled in the art can discern the various parameters needed for a proper execution of the method in this embodiment and others. Given these criteria are satisfied, the present invention asserts that the described allocation method for placing virtual machines based on security needs is a useful and a non-trivial solution to an unsolved problem.

The following embodiments of the present invention utilize game theory to predict attacker targets. The interactions between cloud users and an attacker are modeled, allowing the cloud provider to anticipate future steps of the attack and identify the most likely targeted users based on the observed events and equilibrium states. First, the interaction between the users and the attacker is modeled as a 4-player simultaneous game. The cloud provider and users can use the model to minimize any damage attempted by an attacker, as well as proactively respond to future attack steps in such a way that an attack is mitigated.

Figure 2:
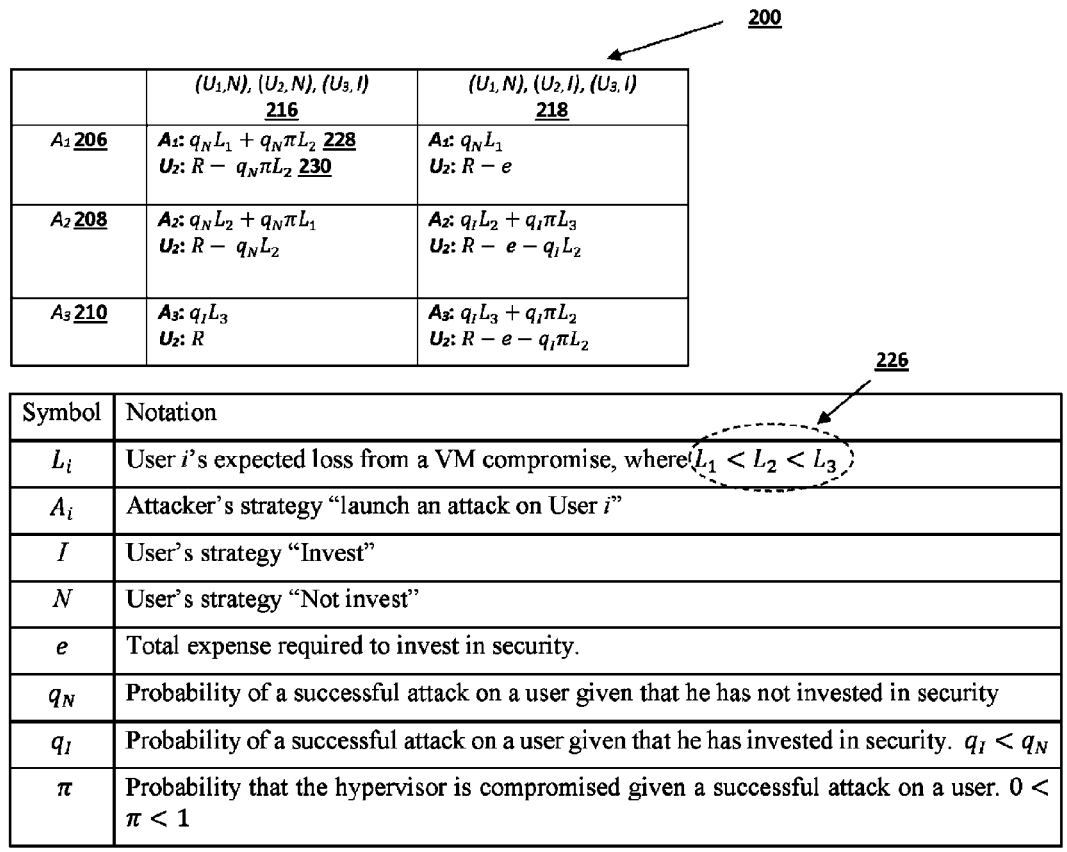
FIG. 2 depicts one embodiment of the game model payoff matrix for the simplest case, including associated variables and assumptions. It is useful for understanding various arrangements described herein.

Referring to FIG. 2, the game matrix 200 is the simplest case for the cloud security game and diagrams the following: An attacker and 3 users, acting across two hypervisors.

For this embodiment and all embodiments herein, the total loss that a user i will experience from a successful VM compromise is noted as $L_i$ 202. Furthermore, users are ordered by loss potential such that $L_1<L_2< \ldots <L_{n-1}<L_n$. This means that User 1 will have the smallest loss from VM compromise on the cloud while User n will have the largest. The strategies for the attacker 204 includes targeting either User 1, 2, or 3 ($A_1$ 206, $A_2$ 208, or $A_3$ 210), as is shown by the three rows. If the user pays the expense to upgrade their VM then they are said to have made an investment in security. The strategy for the users are binary since the only choices are to invest (I) in security 212 or to not invest (N) in security 214. The strategy profiles for the 3 users in the top two columns 216, 218 are given as (user, strategy). The left column 216 involves a scenario in which users 1 and 2 do not invest in security and User 3 does invest in security. The right column 218 involves a scenario in which User 1 does not invest in security and users 2 and 3 invest in security.

In the instance of choosing to invest in security, the user will be allocated to hypervisor 2 ($H_2$) while no investment in security will result in the user being allocated to hypervisor 1 ($H_1$). In this way, $H_2$ is the more secure platform for security-conscious cloud users.

The cost associated for investing in security is denoted as e 220. By investing in security, the user decreases their chance of compromise from $q_N$ 222 to $q_I$ 224. For the purpose of this embodiment and all embodiments herein, allocating to $H_1$ and not investing in security will be used interchangeably, and allocating to $H_2$ and investing in security will be used interchangeably.

As seen, User 1 will be allocated onto $H_1$ (because User 1 makes no investment in security) and User 3 will be allocated to $H_2$ (because User 3 makes an earnest investment in security) in all game scenarios. This is due to the assertion 226 of assigning VMs to hypervisors by increasing loss potential for each user, giving User 3 the largest potential loss in this case. There are other embodiments in which the largest and smallest users of a cloud network may allocate to the same hypervisor, but for the purpose of this embodiment it is held so one skilled in the art may more easily discern the game outcome for User 2, who is the only user making a choice as to invest in security or not.

Since User 2 will have two strategies (212, 214) and the attacker has three strategies (206, 208, 210) there are a total of six possible permutations in the normal form game, as diagrammed. For each permutation, the attacker's payoff is shown on the top 228 and User 2's payoff is shown on the bottom 230. The attacker's payoff is calculated as the expected loss of the directly attacked user, plus the expected loss of any additional user that is on the hypervisor times the probability that the attack will reach this secondary user. The chance an indirect attack will reach a user is given as π 232, which is the probability that either hypervisor in the embodiment will be compromised. In this way, π is the *measure of the interdependency between users. It is assumed that an attacker can only attack one VM at a time (and thus one hypervisor at a time). User 2's payoff is calculated as the reward from using cloud services R minus user 2's expected loss and expense in security e, if any. User 2's expected loss will have a π value included if User 2 is not directly targeted by the attacker.

Referring to FIG. 3, the game matrix 300 is the simplest case game 200 extended to n users. All variables from game 200 remain the same. The set-up, number of hypervisors (2), payoff structure of the users and payoff structure of the attacker also remain the same. Similar to the previous embodiment, Users 1 and n will not invest and invest in security, respectively, regardless of expense e.

Consistent with criteria 2 to reduce interdependency between users, for any User i that invests in security, all Users i+1 through n will also invest in security. Further, for any User i that does not invest in security, all Users 1 through i−1 will not invest in security as well. There can be no scenario, for example, in which User 2 invests in security but User 5 does not. With this observation, all possible scenarios modeling the payoff structures of these unstable outcomes are not included in the matrix. This is because these scenarios allow for players to gain by deviating from the allocation induced, an undesirable outcome.

In the game matrix 300 there are (n−1)*n permutations. The following section will discuss under which conditions some of these permutations will allow for profiles such that all users do not gain by deviating from the allocation. When users are structured in a way such that they do not desire to deviate from their decision to invest or not in order to increase their utility, then this is a desirable and stable outcome.

Referring to FIG. 4, cases 1-3 (402-406) are the Nash Equilibrium that result based on the prevailing conditions met from the normal form game of FIG. 3. In game theory, a Nash Equilibrium is the condition in which no player can unilaterally deviate from their decision to improve their utility. In this way, the Nash Equilibrium profile 400 of the game matrix 300 is an optimal solution for each user, taking the other users' actions into account Additionally, the strategy profile for the game is stated in FIG. 4 as (attacker strategy, Largest user on $H_1$). For example, the profile 408 of case 1 402 is an attacker that targets User n (who invests in security) while all Users n–1 through 1 do not invest in security. This is denoted as ($A_n$, $U_{n-1}$). Under the conditions of case 1, the arrangement of virtual machines on the cloud under profile 408 is such that no player can unilaterally deviate from their decision to improve their utility.

For mixed Nash Equilibrium case 4 406, the specific probabilities are found in a way such that the attacker is indifferent from attacking either hypervisor. This observation is consistent with criteria 4, since the conditions under which the attacker is indifferent to attacking either hypervisor is when both hypervisors are risk balanced. For the case 2 and its subcases, criteria 3, it is apparent since a large factor in the equilibrium conditions are based on the expense factor e. Case 1 is a unique instance in which User n is so large such that the attacker will target it alone and all other users will allocate to $H_1$ and avoid the attack. In this case, the hypervisors are risk balanced as much as possible.

After covering two sample models of the attacker/cloud user game, a sample embodiment will now be shown for the implementation of the security allocation method. The equilibrium cases 402-406 will be the foundation for the method in the following embodiment.

Figure 5:
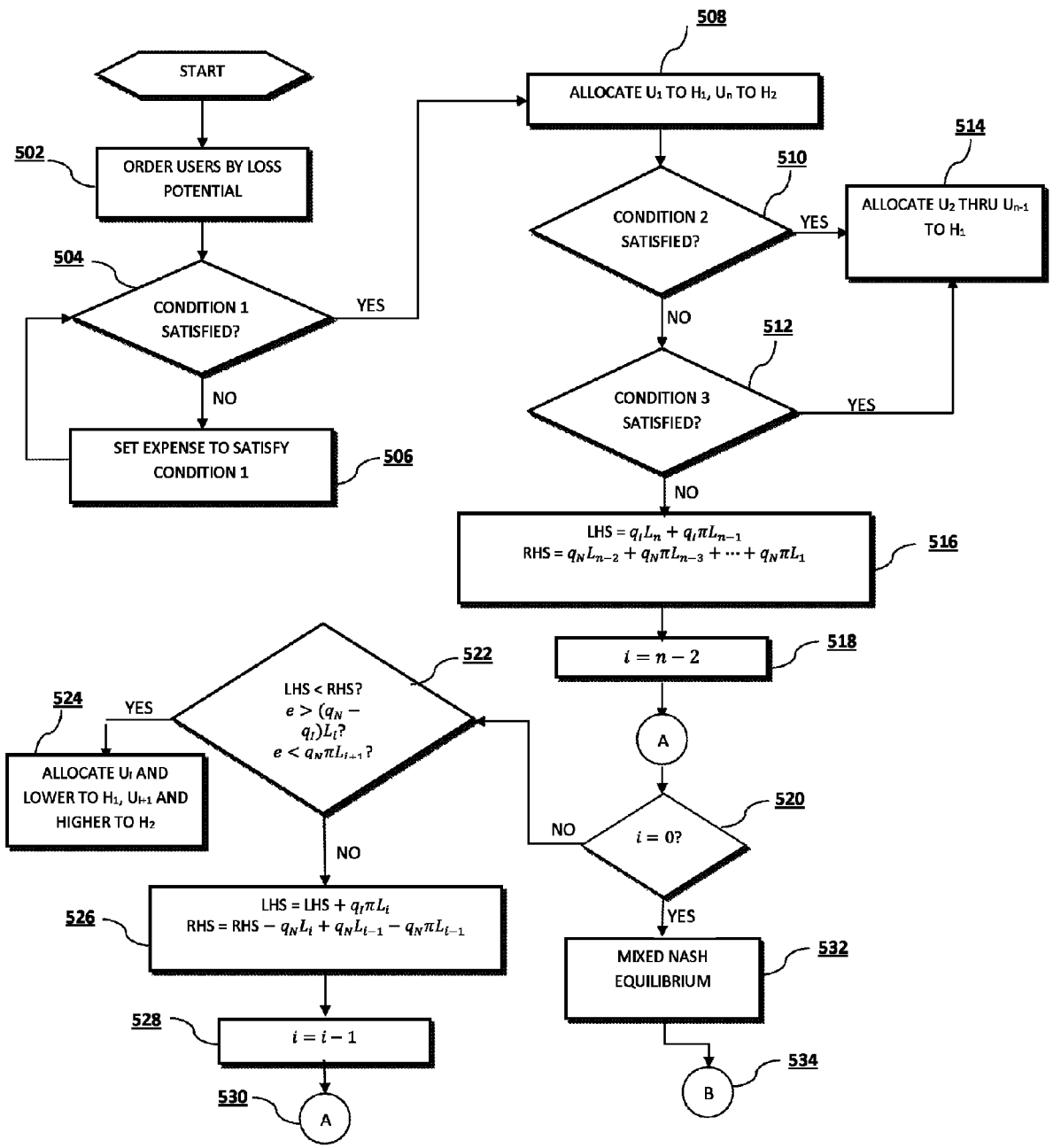
FIG. 5 depicts a flowchart illustrating how the security allocation system operates for one embodiment.

Referring to FIG. 5, the present invention provides a flowchart detailing one embodiment of the method with two hypervisors and n users. We start by ordering 502 all users 1, . . . , n by increasing loss potential such that $L_1 < L_2 < \ldots < L_{n-1} < L_n$. In 504 the present invention checks to see if condition 1 is satisfied. This condition allows for sufficient evidence that the users with the smallest and largest loss potential will always allocate to $H_1$ and $H_2$, respectively. If condition 1 is not met, then e may be set 506 by the cloud provider so that it is.

Once satisfied, the present invention allocates $U_1$ to $H_1$ and $U_n$ to $H_2$ 508. The allocation of the remaining users will be based on the equilibrium conditions (402-406) in the cases from FIG. 4. If either condition 2 510 or condition 3 512 are satisfied, the present invention moves to same result 514 and allocates $U_2$ through $U_{n-1}$ to $H_1$ and thus only $U_n$ will be on $H_2$. Otherwise, the present invention begins an iterative method 516 to check all other possible equilibrium solutions for pure Nash Equilibrium. The present invention begins the first iteration at 518 by checking for possible equilibrium solutions at i=n–1.

The present invention tests i=n–2 using conditions at 522. If not satisfied, the present invention moves to change the LHS (Left Hand Side) and RHS (Right Hand Side) to reflect a new potential equilibrium condition at 526 and then begins the check again at an i value one unit lower than the previous. If at any time the conditions 522 are satisfied for any value of i for 1≤i≤n–2, i∈ℤ during the iterative method, then the present invention allocates 524 $U_i$ and lower to $H_1$ and $U_{i+1}$ and higher to $H_2$. Once i iterates down to 0 and for any 1≤i≤n–2, i∈ℤ there was no value of i that satisfied all conditions of 524, then the method of the present invention admits a mixed Nash Equilibrium solution 532.

In a mixed Nash profile, the present invention finds the User i such that the attacker will target whichever hypervisor they are resident on. This is done by equalizing the total expected loss on both hypervisors 534. This is the method in the present invention for balancing risk on hypervisors, as explained in criterion 3. The iterative method 520-530 can similarly be applied to find User i in 534.

Once $U_i$ is found. 536 $U_{i-1}$ and lower are allocated to $H_1$ and $U_{i+1}$ and higher are allocated to $H_2$. User i will allocate to $H_1$ with probability α and $H_2$ with probability 1–α. The exact value of α can be determined by the level at which the attacker is exactly indifferent between targeting $H_1$ and $H_2$. In the event that rounding errors in the calculations 562 and 564 might cause endless execution of the loop 558-560 then a safeguard 570 forces convergence through a minor adjustment to e.

Figure 6:
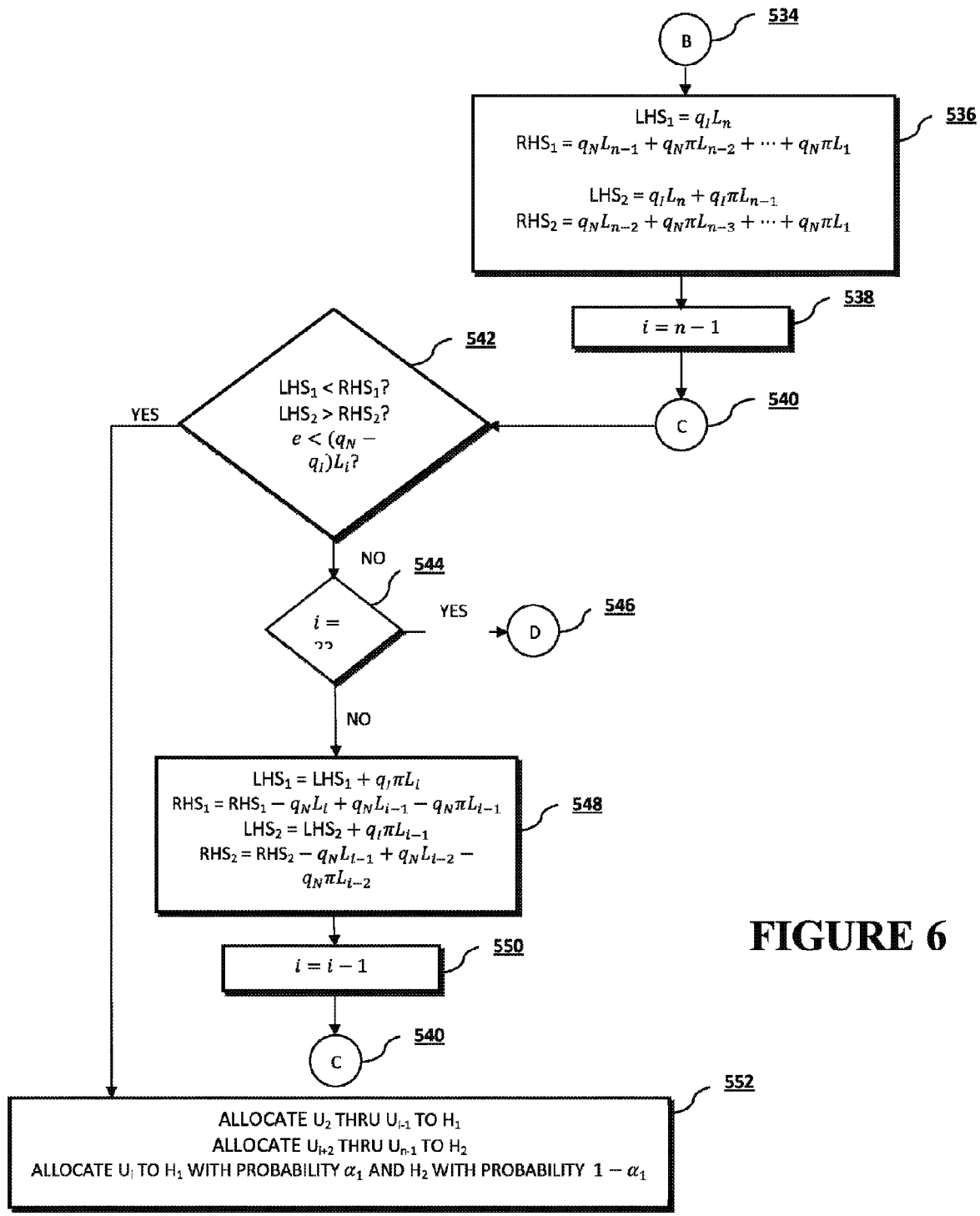
FIG. 6 is a continuation of the flowchart of FIG. 5.

At the mixed Nash equilibrium, User i must randomize in such a way that the attacker is indifferent to choosing either strategy. Referring to FIG. 6, once the search for the degree of randomization begins 538 the present invention traverses the connector 540, the decision diamond 542, a subsequent decision diamond 544, the assignment block 548 to update the search criterion, an assignment block 550 to update the search index, and returns to the connector 540. A continuing re-focus of the search results in either a decision 542 that assigns 552 the allocation of the users to hypervisors 552 according to a distribution $α_1$ or a decision 544 that declares the existence of a different mixed Nash equilibrium 546. The full expression for $α_1$ is shown in FIG. 9.

Figure 7:
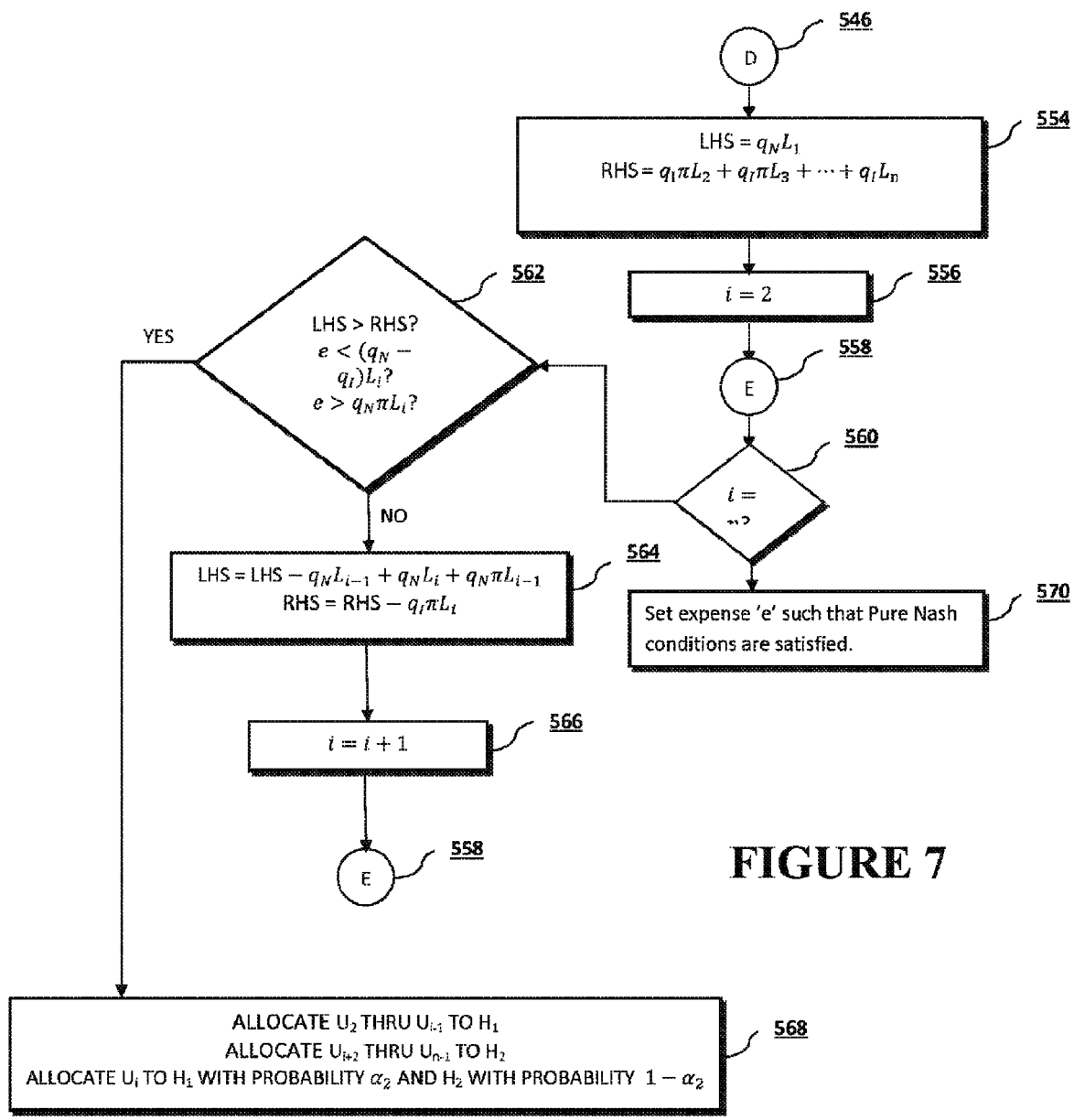
FIG. 7 is a continuation of the flowchart in FIG. 6.

Referring to FIG. 7, the search for the remaining mixed Nash equilibrium is initiated 546 and commences with an assignment of quantities 554 and of the initial search index 556. The search for the degree of randomization for the second mixed Nash equilibrium begins 558 and the present invention traverses the connector 558, the decision diamond 560, a subsequent decision diamond 562, the assignment block 564 to update the search criterion, an assignment block 566 to update the search index, and returns to the connector 558. A continuing re-focus of the search results in either a decision 560 that assigns 568 the allocation of the users to hypervisors 568 according to a distribution $α_2$ or a decision 560 that detects the index i has reached its maximum value and invokes an assignment block 570 that acts as a safeguard. Rounding errors in the calculations 562 and 564 might cause endless execution of the loop 558-560. The presence of a safeguard 570 forestalls endless loop execution by forcing convergence through a minor adjustment to e in 570. The full expression for $α_2$ is shown in FIG. 9.

Clearly many modifications and variations of the present invention are possible in light of the above teachings. It should therefore be understood that, within the scope of the inventive concept, the invention may be practiced otherwise than as specifically claimed.

What is claimed is:

1. A method for enhancing security in a cloud computing system having a cloud computing provider, cloud computing users, and hypervisors, comprising:

observing interactions between an attacker and said cloud computing users;

identifying the most likely targeted users, wherein said identifying further comprises an observation of events and equilibrium states;

based on said observation of interactions, minimizing damage caused by said attacker and providing a proactive response to subsequent attacks;
an ordering of all said users according to their respective loss potential in increasing order;
a determination that a first condition $$L_1(q_N-q_I\pi)<e<L_n(q_N-q_I)$$

is satisfied;
wherein when said first condition is not satisfied, said cost associated with investing in security, e, is set by said cloud provider to satisfy said first condition; and
wherein when said first condition is satisfied, said met od further comprises
an allocation of a first said user to a first said hypervisor; and
an allocation of an $n^{th}$ said user to an $n^{th}$ said hypervisor,
wherein
$L_1$ is the loss potential for a first said user;
$L_n$ is the loss potential for an $n^{th}$ said user;
$q_N$ is the probability of compromise when not having invested in security;
$q_I$ is the probability of compromise when having invested in security;
e is the cost associated with investing in security; and
$\pi$ is the probability that a hypervisor is compromised given a successful attack on a user.

2. The security enhancement of claim 1, wherein said $n^{th}$ said hypervisor is a second said hypervisor.

3. The security enhancement method of claim 2, further comprising a determination that a second condition $$L_n > \frac{q_N}{q_I}(L_{n-1}+\pi L_{n-2}+\ldots+\pi L_2+\pi L_1)$$

and a third condition $$L_n < \frac{q_N}{q_I}(L_{n-1}+\pi L_{n-2}+\ldots+\pi L_2+\pi L_1) \text{ and } e<(q_N-q_I)L_{n-1}$$

are satisfied.

4. The security enhancement method of claim 3, wherein when either said second or said third conditions are satisfied, said method further comprises an allocation of all users beginning with a second said user through a $(n-1)^{th}$ said user to said first said hypervisor.

5. The security enhancement method of claim 3, wherein when neither said second nor said third conditions are satisfied, said method further comprises an iterative determination for a Nash Equilibrium solution.

6. The security enhancement method of claim 5, wherein said determination for a Nash Equilibrium solution further comprises:
an iteration value setting of i=n−2, where i is said iteration value, and n is the number of said users; and
an allocation of current and lower iteration users to said first hypervisor and
an allocation of all higher iteration users to said second hypervisor when all the following conditions are satisfied $$e>(q_N-q_I)L_i;$$

$$e<(q_N\pi-q_I)L_i; \text{ and}$$

LHS<RHS where LHS is a left hand side of said equilibrium; and RHS is a right hand side of said equilibrium.

7. The security enhancement method of claim 6, wherein said determination for a Nash Equilibrium solution further comprises
a new equilibrium condition when the following conditions are not all satisfied $$e>(q_N-q_I)L_i;$$

$$e<(q_N\pi-q_I)L_i; \text{ and}$$

LHS <RHS;

wherein said new equilibrium condition comprises
updating a left hand side (LHS) of said equilibrium according to LHS=LHS+$q_I\pi L_i$;

updating a right hand side (RHS) of said equilibrium according to

RHS =RHS$-q_N L_i+q_N L_{i-1}-q_N\pi L_{i-1}$; and decrementing said iteration value by 1.

8. The security enhancement method of claim 7, further comprises
a determination whether said iteration value i is equal to zero; and when said iteration value i is not zero; and
a continuation of said iterative determination for a Nash Equilibrium solution when said iteration value i is not zero.

9. The security enhancement method of claim 8, further comprises a determination that a mixed Nash Equilibrium exists when said iteration value i is zero.

10. The security enhancement method of claim 9, further comprising
a first left hand side (LHS) placeholder of said equilibrium $LHS_1$ set to $LHS_1=q_I L_n$ a first right hand side (LHS) placeholder of said equilibrium $RHS_1$ set to $RHS_1=q_I L_{n-1}+q_N\pi L_{n-2}+\ldots+q_N\pi L_1$ a second left hand side (LHS) placeholder of said equilibrium LHS2 set to $LHS_2=q_I L_n+q_I\pi L_{n-1}$ a second right hand side (LHS) placeholder of said equilibrium $RHS_2$ set to $RHS_1=q_I L_{n-2}+q_N\pi L_{n-3}+\ldots+q_N\pi L_1$; and a resetting of said iteration value i to i =n−1.

11. The security enhancement method of claim 10, further comprising
an allocation of second user through $(i-1)^{th}$ users to said first hypervisor;
an allocation of $(i+2)^{th}$ users through $(n-1)^{th}$ users to said second hypervisor;
an allocation of an $i^{th}$ user to said first hypervisor with a probability of $\alpha_1$; and
an allocation of said $1^{th}$ user to said second hypervisor with a probability of $(1-\alpha_1)$
when all of the following conditions are satisfied $LHS_1$<$RHS_1$;

$LHS_2$>$RHS_2$; and $e<(q_N-q_I)L_i$.

12. The security enhancement method of claim 11 further comprises when $LHS_1 < RHS_1$;

$LHS_2 > RHS_2$; and $e < (q_N - q_I) L_i$ are all not satisfied, the following:
upon a determination that said iteration value i is not equal to 2;
setting $LHS_1 = LHS_1 + q_I \pi L_i$;

$RHS_1 = RHS_1 - q_N L_i + q_N L_{i-1} - q_N \pi L_{i-1}$;

$LHS_2 = LHS_2 + q_I \pi L_{i-1}$;

$RHS_2 = RHS_2 - q_N L_{i-1} + q_N L_{i-2} - q_N \pi L_{i-2}$;

a resetting of said iteration value i to i=i−1; and
a redetermination whether $LHS_1 < RHS_1$;

$LHS_2 > RHS_2$; and $e < (q_N - q_I) L_i$ are all satisfied.

13. The security enhancement method of claim 12, further comprises upon a determination that said iteration value i is equal to 2,
a setting of $LHS = q_N L_1$;

$RHS = q_I \pi L_2 + q_I \pi L_3 + \ldots + q_I \pi L_n$;

a resetting of said iteration value i to i=2; and
upon a determination that iteration value i equals n,
a setting of said cost associated with investing in security e so as to satisfy pure Nash Equilibrium conditions.

14. The security enhancement method of claim 13, further comprising when said iteration value i is not equal to n,
an allocation of second user through $(i-1)^{th}$ users to said first hypervisor;
an allocation of $(i+2)^{th}$ users through $(n-1)^{th}$ users to said second hypervisor,
an allocation of an $i^{th}$ user to said first hypervisor with a probability of $\alpha_2$; and
an allocation of said $i^{th}$ user to said second hypervisor with a probability of $(1-\alpha_2)$ when all of the following conditions are satisfied $LHS > RHS$;

$e < (q_N - q_I) L_i$; and $e > q_N \pi L_i$.

15. The security enhancement method of claim 14 further comprises when $LHS_1 < RHS_1$;

$LHS_2 > RHS_2$; and $e < (q_N - q_I) L_i$ are all not satisfied, the following:
setting $RHS = RHS - q_I \pi L_i$;

$LHS = LHS - q_N L_{i-1} + q_N L_i + q_N \pi L_{i-1}$;

a resetting of said iteration value i to i=i+1; and
a redetermination whether said iteration value i equals n.

16. The security enhancement method of claim 14, wherein said probability $\alpha_1$ is $$\alpha_1 = \frac{q_I(1-\pi)(L_n - L_i)}{q_N \pi (L_1 + L_2 + \ldots + L_{i-1}) - q_I \pi (L_{i+1} + L_{i+2} + \ldots + L_n) + [q_N - q_I(1-\pi)]L_i}$$

and
wherein said probability $\alpha_2$ is $$\alpha_2 = \frac{q_N \pi (L_1 + L_2 + \ldots + L_{i-2}) - q_I \pi (L_{i+1} + L_{i+2} + \ldots + L_n) + q_N L_{i-1} - q_I L_i}{q_N \pi (L_1 + L_2 + \ldots + L_{i-1}) - q_I \pi (L_{i+1} + L_{i+2} + \ldots + L_n) + [q_N(1-\pi) - q_I]L_i}$$

* * * * *